(12) United States Patent
Froggatt

(10) Patent No.: US 8,537,367 B2
(45) Date of Patent: Sep. 17, 2013

(54) OPTICAL IMAGING FOR OPTICAL DEVICE INSPECTION

(75) Inventor: Mark E. Froggatt, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 105 days.

(21) Appl. No.: 13/144,719

(22) PCT Filed: Jan. 14, 2010

(86) PCT No.: PCT/US2010/020976

§ 371 (c)(1),
(2), (4) Date: Jul. 15, 2011

(87) PCT Pub. No.: WO2010/083269

PCT Pub. Date: Jul. 22, 2010

(65) Prior Publication Data

US 2011/0273719 A1 Nov. 10, 2011

Related U.S. Application Data

(60) Provisional application No. 61/145,527, filed on Jan. 17, 2009.

(51) Int. Cl.
*G01L 1/24* (2006.01)
(52) U.S. Cl.
USPC ........... 356/466; 356/477; 356/479; 356/73.1
(58) Field of Classification Search
USPC ........... 356/73.1, 497, 446, 477; 250/227.14, 250/227.12
See application file for complete search history.

(56) References Cited

U.S. PATENT DOCUMENTS

| 5,202,745 | A | * | 4/1993 | Sorin et al. | 356/73.1 |
| 5,268,741 | A | * | 12/1993 | Chou et al. | 356/479 |
| 5,798,521 | A | | 8/1998 | Froggatt | |
| 5,844,235 | A | * | 12/1998 | Tachikawa et al. | 250/227.14 |
| 6,069,698 | A | | 5/2000 | Ozawa et al. | |
| 6,201,608 | B1 | * | 3/2001 | Mandella et al. | 356/491 |
| 7,330,245 | B2 | * | 2/2008 | Froggatt | 356/73.1 |
| 7,397,543 | B2 | * | 7/2008 | Nebendahl | 356/73.1 |
| 7,440,087 | B2 | * | 10/2008 | Froggatt et al. | 356/73.1 |

(Continued)

OTHER PUBLICATIONS

International Search Report for PCT/US2010/020976, mailed Aug. 13, 2010.

*Primary Examiner* — Sang Nguyen
(74) *Attorney, Agent, or Firm* — Nixon & Vanderhye P.C.

(57) ABSTRACT

An optical imaging apparatus based on optical frequency domain measurement (OFDM) collects scatter data at multiple locations within or on the DUT as a function of time. A light source launches light into a device under test (DUT) which scatters light at one or more locations along the DUT. A light detector detects a portion of light scattered at each of multiple locations along the DUT. Data is determined using OFDM data processing that corresponds to an amount of light collected at each of the multiple locations along the DUT as a function of time. The data is stored for each of the multiple locations along the DUT. User information is provided that indicates an amount of light scattered at each of the multiple locations along the DUT based on the stored time domain data. The OFDM processing permits fine time resolution (e.g., 0.1 picoseconds) that allows small optical delay distances (e.g., 30 microns) to be resolved and allows for accurate detection of small amounts of scatter (e.g., one trillionth) to be detected simultaneously with the fine time resolution.

38 Claims, 13 Drawing Sheets

(56) References Cited

U.S. PATENT DOCUMENTS

| | | | |
|---|---|---|---|
| 7,515,276 B2 * | 4/2009 | Froggatt et al. | 356/497 |
| 8,116,624 B1 * | 2/2012 | Wach | 398/20 |
| 2003/0095721 A1 | 5/2003 | Clune et al. | |
| 2005/0219512 A1 * | 10/2005 | Froggatt et al. | 356/73.1 |
| 2008/0002187 A1 * | 1/2008 | Froggatt | 356/73.1 |
| 2009/0103100 A1 * | 4/2009 | Froggatt et al. | 356/477 |

\* cited by examiner

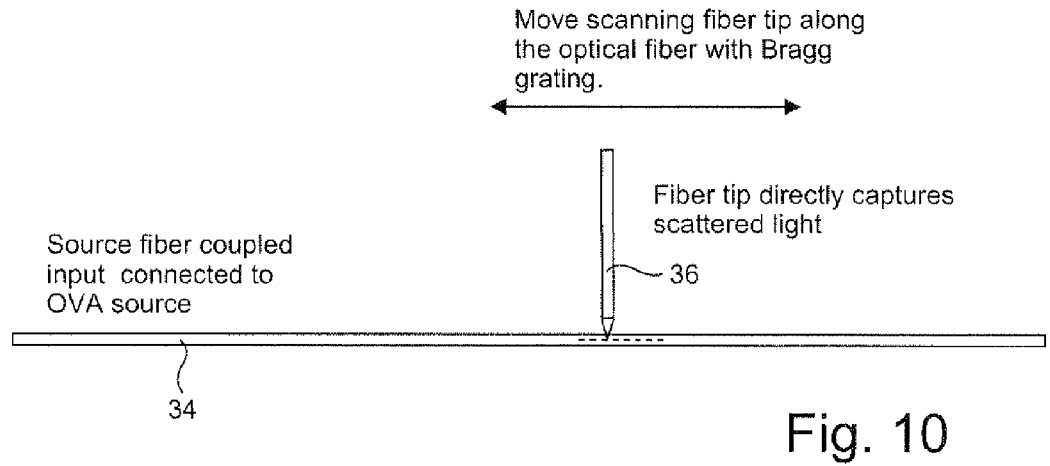
Fig. 10
Fig. 11
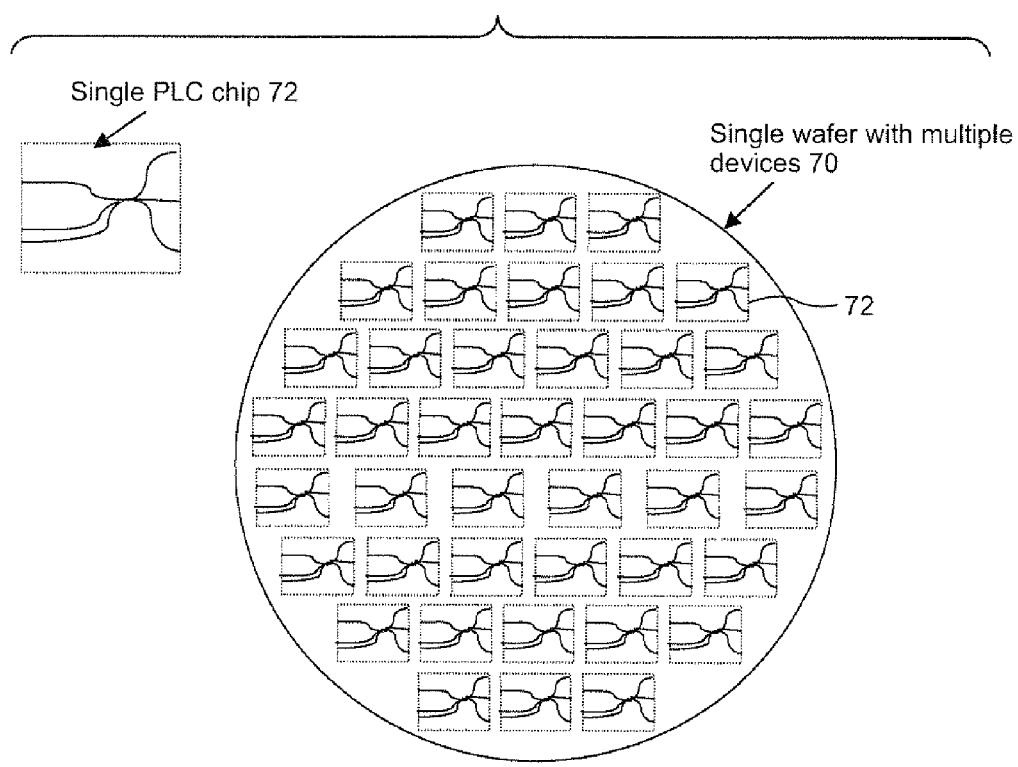

OPTICAL IMAGING FOR OPTICAL DEVICE INSPECTION

RELATED APPLICATION

This application is the U.S. national phase of International Application No. PCT/US2010/020976, filed 14 Jan. 2010, which claims priority from U.S. provisional patent application 61/145,527, filed on Jan. 17, 2009.

TECHNICAL FIELD

The technical field relates to optical measurements, and more particularly, to advantageous new uses of Optical Frequency Domain Reflectometry (OFDR) in optical device inspection and/or testing such as optical waveguides.

BACKGROUND

Optical circuits include, but are not limited to, light sources, detectors and/or waveguides that provide such functions as splitting, coupling, combining, multiplexing, demultiplexing, and switching. Planar Lightwave Circuits (PLC's), also known as Planar Waveguides and Photonic Integrated Circuits (PICs), are a rapidly growing segment of the optical communications market, and will eventually subsume most of the optical technologies now in use for optical multiplexing, switching, amplification, etc. Planar lightwave circuits (PLCs) are optical circuits that are manufactured and operate in the plane of a wafer. PLC technology is advantageous because it can be used to form many different types of optical devices, such as array waveguide grating (AWG) filters, optical add/drop (de)multiplexers, optical switches, monolithic, as well as hybrid opto-electronic integrated devices. Such devices formed with optical fibers would typically be much larger or would not be feasible at all. Further, PLC structures may be mass produced on a silicon wafer.

Planar waveguides are tested by dicing a PLC wafer and mounting optical fibers to the edge of a PLC die. Light is sent in to the PLC structure through one optical fiber and a second optical fiber is used to detect the light. A photodetector coupled to the second optical probe detects the power of light transmitted to it. If the PLC works properly, then fibers are permanently attached to the PLC, and the PLC is put into a package. However, if the PLC does not work properly, then the unit is discarded, and the time, effort, and expense to dice, fiber mount, and comprehensively test the device are wasted. Also, in the near future, optical waveguides will appear as long distance (e.g., centimeters) signal carriers in high-speed electronics. There is also a growing body of technology based on surface plasmons.

Another challenge in testing these types of optical devices is to determine, in addition to the amount of light lost (escaped from the optical device) but also the specific location(s) in that device where light is being lost. Thus there is need for test equipment specifically designed test the performance of these various optical devices and to also provide specific information regarding the amount and location of light loss.

SUMMARY

An optical imaging apparatus and method based on optical frequency domain measurement (OFDM) are provided for collecting scatter data at multiple locations within or on the DUT as a function of time. OFDM includes optical frequency domain reflectometry (OFDR), transmission-OFDR, and swept wavelength interferometry. A light source provides light that is coupled into a device under test (DUT) which scatters light at one or more locations along the DUT. In one example embodiment, light from the light source may be launched in the DUT by scattering the light into the DUT. A light detector detects a portion of light scattered at each of multiple locations along the DUT. Preferably, but not necessarily, optics collecting light scattered from the DUT are located outside an evanescent field of the DUT. Data is determined using OFDM data processing that corresponds to an amount of light collected at each of the multiple locations along the DUT as a function of time. The data is stored for each of the multiple locations along the DUT. The OFDM processing permits fine time resolution (e.g., 0.1-3 picoseconds) that allows small optical delay distances (e.g., 30 microns-1 mm) to be resolved and allows for accurate detection of small amounts of scatter (e.g., one billionth to trillionth) to be detected simultaneously with the fine time resolution.

User information is provided that indicates an amount of light scattered at each of the multiple locations along the DUT based on the stored time domain data. In one example embodiment, the user interface displays movement of light launched into the DUT as the light propagates along the DUT based on the stored time domain data. The user interface may also display an intensity or brightness of light scattered by the DUT at a specific time from when the light was launched from the light source based on the stored time domain data. An intensity or brightness of light scattered by the DUT may further be displayed at multiple locations along the DUT as a calculated light pulse travels along the DUT based on the stored time domain data in a fashion that is distinguishable from DUT cladding mode light also detected by the light detector. In some applications, the user interface shows movement of a calculated light pulse through the DUT at a speed slower than an actual speed at which the light propagated through the DUT.

The DUT may be any sort of optically testable material or device. Non-limiting example include a planar waveguide light circuit (PLC) or photonic integrated circuit (PIC), a gelatin waveguide, or a surface plasmon waveguide. In one example embodiment, the DUT includes multiple planar waveguide light circuits (PLCs) formed on a wafer. The optical imaging apparatus tests each PLC on the wafer without dividing the PLCs into individual PLC dies.

The multiple locations for detecting DUT scattered light exceeds a thousand locations in one example embodiment. In another example embodiment, the multiple locations is sufficient to create a 128×128 image of light intensity of scattered light along the DUT over time. One example embodiment uses a CCD array as the light detector to detect a 2-dimensional image of the scatter data along the DUT as a function of time.

One particular example implementation is where the data corresponding to an amount of light collected at each of the multiple locations along the DUT as a function of time corresponds to an impulse response measurement of the DUT. The OFDR processing circuitry generates DUT location data associated with light intensity for each of the multiple locations, and a memory stores the DUT location data associated with light intensity for each of the multiple locations. The OFDM processing uses a Fourier transform to calculate a time domain impulse response for a path of the light through the DUT.

An example embodiment may use a translation stage arranged to move the DUT beneath the light detector, and the light detector may be an optical fiber positioned adjacent to the DUT. Alternatively, multiple fiber detectors may be used for detecting scattered light.

Another example embodiment may use a scanning mirror, and a objective lens arranged to acquire scattered light at each of the multiple locations along the DUT.

In yet another example embodiment, an electronic translator automatically moves the optical detector to the multiple locations of the DUT.

BRIEF DESCRIPTION OF THE DRAWINGS

FIG. 10 shows an example where scatter is measured from a Bragg grating in a DUT;

FIG. 11 illustrates an example PLC wafer with multiple PLC chips;

DETAILED DESCRIPTION

Figure 1:
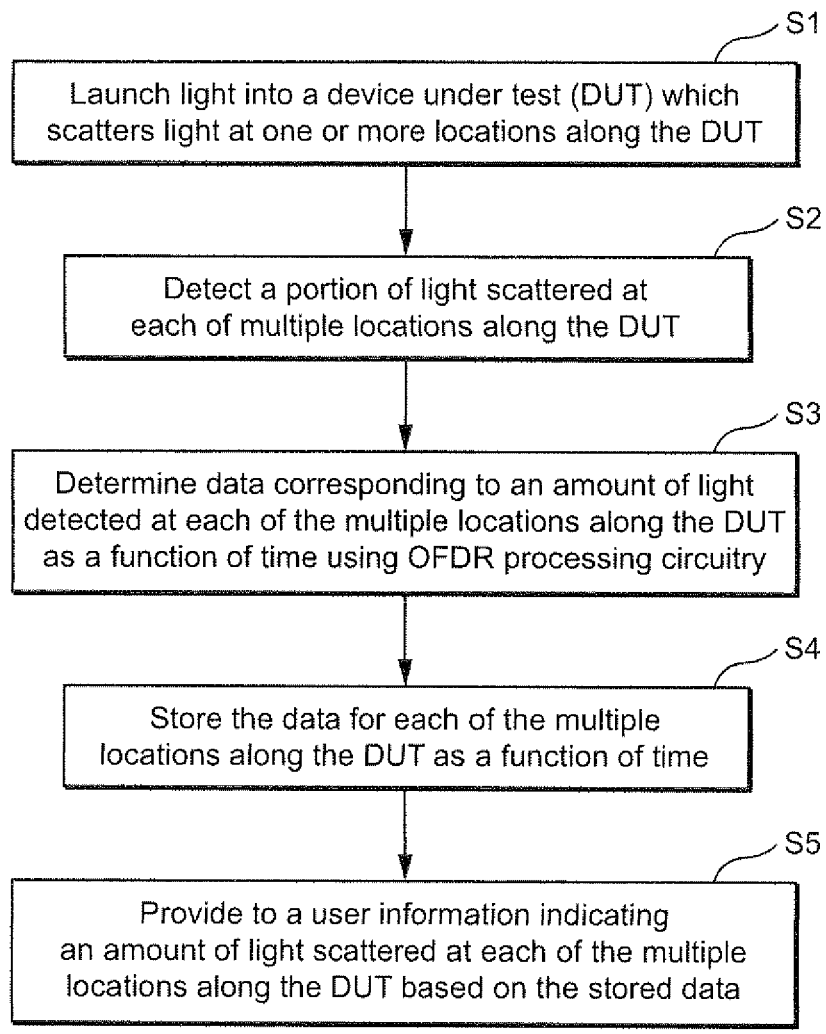
FIG. 1 is a non-limiting flowchart diagram illustrating example procedures for observing and testing Planar Light Circuits (PLC's) using a transmission swept wavelength interferometric system.

The following description sets forth specific details, such as particular embodiments, procedures, techniques, etc. for purposes of explanation and not limitation. But it will be appreciated by one skilled in the art that other embodiments may be employed apart from these specific details. As explained below, the description assumes a transmissive OFDR system notwithstanding the fact that OFDR includes the word reflectometry. The principles and techniques described in this OFDR context may be used in other types of interferometric measurement systems such as Optical Vector Analyzers (OVAs) and distributed optical-fiber sensing systems. OFDR as used in this application includes both reflective and transmissive OFDR. Accordingly, the term optical frequency domain measurement (OFDM) is also used to encompass all optical measurement techniques including optical vector analysis, reflective and transmissive OFDR, Swept Wavelength Interferometry (SWI), etc. In some instances, detailed descriptions of well known methods, interfaces, circuits, and devices are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Swept Wavelength Interferometry (SWI) a type of Optical Frequency Domain Reflectometry (OFDR) developed by Luna Technologies, provides high resolution (<1 ps) in time and high optical power detection sensitivity (<−130 dB). SWI technology is described, for example, in U.S. patents: "Apparatus and method for measuring strain in bragg gratings," U.S. Pat. No. 6,376,830 "System and method for measuring the transfer function of a guided wave device," U.S. Pat. No. 6,900,897 "Apparatus and method for correcting errors generated by a laser with non-ideal tuning characteristics," U.S. Pat. No. 7,042,573 "Apparatus and method for the complete characterization of optical devices including loss, birefringence and dispersion effects," U.S. Pat. No. 7,330,245 "Calculation of birefringence in a waveguide based on Rayleigh scatter," U.S. Pat. No. 7,379,168 "Polarization diversity detection without a polarizing beam splitter," U.S. Pat. No. 7,440,087 "Identifying optical fiber segments and determining characteristics of an optical device under test based on fiber segment scatter pattern data," U.S. Pat. No. 7,515,276 "High resolution interferometric optical frequency domain reflectometry (OFDR) beyond the laser coherence length," U.S. Pat. No. 7,538,883 "Distributed strain and temperature discrimination in polarization maintaining fiber," and U.S. Pat. No. 7,633,607 "Method and apparatus for calibrating measurement equipment," the disclosures of which are incorporated here by reference.

The inventor in this application realized that this combination of SWI capabilities (high resolution and sensitivity) means that SWI can both detect the small amounts of light scattered from waveguides in PLCs and also resolve the light arrival time at any particular location in the PLC. This time measurement allows the system to observe how light pulses travel through the PLC waveguides or other optical system. Transmissive, reflective, and scattering events can be observed as the light travels through the waveguide as well as other effects on the light such as dispersion. If the signal levels are high enough, amplitude and phase transfer functions between points in the waveguide may be determined, which can be used to characterize optical planar waveguide devices before they have been diced and processed (as explained in more detail below). Further, the ability to examine transfer functions that occur within a device, rather than strictly between ports, will allow problem areas in that device to be more rapidly identified.

Although OFDR systems usually detect and process reflected light, hence the name optical frequency domain reflectometry, the inventor discovered that OFDR principles work equally well on transmitted light where the light is input into a device under test (DUT) and light that is transmitted via (rather than reflected by) the DUT is detected in transmission. Reference is now made to FIG. 1 which is a non-limiting flowchart diagram illustrating example procedures for observing and testing a DUT like one or more Planar Light Circuits (PLCs) using a transmission wavelength interferometric system like OFDR.

Initially, light "swept" or tuned through a sequence of wavelengths, (i.e., using a tunable laser), is input into a device under test (DUT) which scatters light at one or more locations along the DUT (step S1). A portion of light scattered at each of the multiple locations along the DUT is detected (step S2). Time domain data corresponding to an amount of light detected at each of the multiple locations along the DUT is determined as a function of time using OFDM processing circuitry (step S3). The time domain data for each of the multiple locations along the DUT as a function of time is stored in memory (step S4). Information indicating an amount of light scattered at each of the multiple locations along the DUT based on the stored time domain data is then provided to a user (step S5).

Figure 2A:
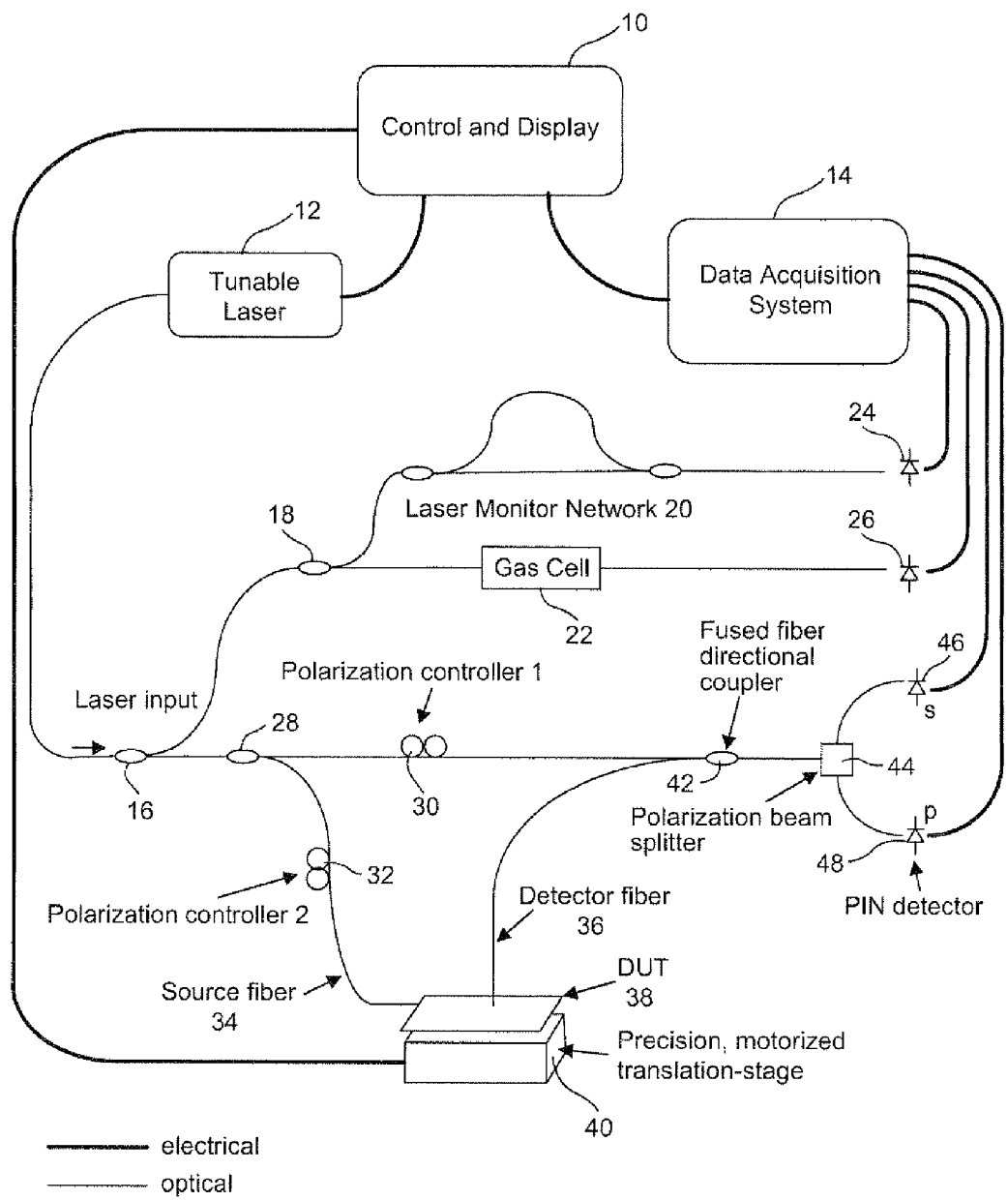
FIG. 2A illustrates a non-limiting example of a transmission swept wavelength interferometric system for observing and testing Planar Light Circuits (PLC's)

FIG. 2A illustrates a non-limiting example of a transmission swept wavelength interferometric system for observing and testing Planar Light Circuits (PLC's). An optical vector analyzer (OVA) is used in this OFDR-transmission mode to test optical characteristics of a DUT 38. A controller and user interface 10 including a display is coupled to a tunable laser 12 and a data acquisition system 14. Note electrical connections are shown as thicker lines and optical connections with thinner lines. The controller and user interface 10 tunes or sweeps the laser 12 across a range of wavelengths. A small portion (<10%) of the incoming laser light is split off at splitter 16 and sent to a laser monitor network 20, whose light intensity is detected by photodiode 24, for measuring the change in the laser wavelength with high accuracy and precision and to a gas cell, whose light intensity is detected by photodiode 26, for establishing the absolute wavelength with high accuracy. The remaining light is then split between reference light and measurement light. The reference light remains internal to the OVA and is combined with received measurement light using a fused-tapered coupler 42 to generate interference fringes. A fiber-coupled polarization beam-splitter 44 is used to direct the light in two orthogonal polarization states to s and p detectors 46 and 48 (e.g., PIN diodes). A polarization controller 30 is adjusted so that the DC level on the s and p detectors 46 and 48 is approximately equal. The measurement light is coupled into the DUT 38 (e.g., a PLC) via polarization controller 32, which allows the polarization state of coupled light to be varied, and then through a suitable optical connection mechanism. Light scattered from the DUT 38 is collected and coupled into a detection fiber 36 which is connected to the coupler 42.

Figure 2B:
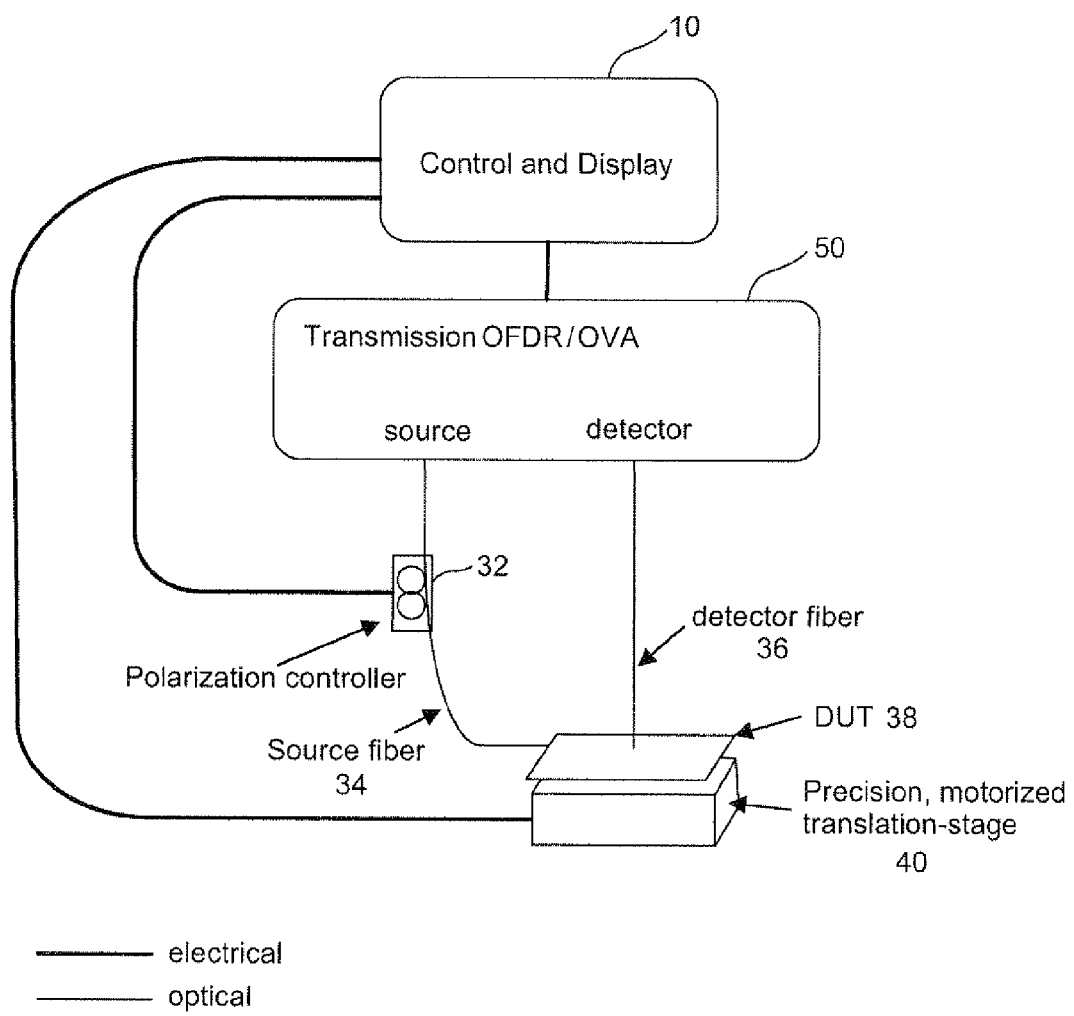
FIG. 2B shows the non-limiting example of FIG. 1 with parts of the OFDR system replaced with a single OFDR function block.

In one non-limiting example implementation, a two dimensional translation stage is moved via a motor controlled by the control and display unit 10 to scan the DUT 38 beneath an optical detector by moving the DUT so that the detector is positioned adjacent to different ones of multiple points along the DUT. FIG. 2B shows the non-limiting example of FIG. 2A with parts of the OFDM system replaced with a single OVA function block 50 with a source port and a detector port. The source port is connected via the polarization controller 32 to the DUT 38 on the motorized translation stage 40. The measurement light from the DUT 38 is provided to the detector port.

The system shown in FIGS. 2A and 2B incorporates a highly sensitive OFDM system coupled to a precision mechanical positioning system to form an imaging system. The OFDM system operates by sweeping the tunable laser 12 through a range of wavelengths and recording the optical responses at four light detectors 24, 26, 46, and 48 using a high speed data acquisition system 14. The signal from the laser monitor network 20 is used to precisely measure the change in the frequency of the tunable laser 12, thus providing highly accurate relative frequency labels for the signals from the other three light detectors 26, 46, and 48. The gas cell 22 signal provides an accurate and stable absolute wavelength reference allowing the signals from the s and p detectors 46 and 48 to be labeled with high absolute wavelength or frequency accuracy as well as high relative wavelength or frequency accuracy. The s and p detectors provide measurements of two polarization components that allows for efficient detection for all polarization states and some measure of variations in the polarization state. This accurate absolute wavelength/frequency label is required by some (but not all) applications of the technology in this application. Using these accurate frequency labels and the corresponding s and p optical data detected at 46 and 48, a Fourier transform is used to calculate a time domain impulse response for the light path through the DUT 38. The Fourier transform reflects a relationship between the length of a cavity (or optical path difference) and its free spectral range. In other words, as the length of an optical path difference increases, the frequency of the interference fringes as a function of the laser frequency increases. Therefore, if one looks at the spectrum of the interference pattern from a swept laser, short paths will appear as low frequencies and long paths will appear as high frequencies. The s and p data may be re-sampled, for example as described in U.S. Pat. No. 5,798,521 incorporated here by reference, so that they are in equal increments of frequency, and a Fast Fourier Transform (FFT) can be used to calculate the time domain impulse response.

Figure 3:
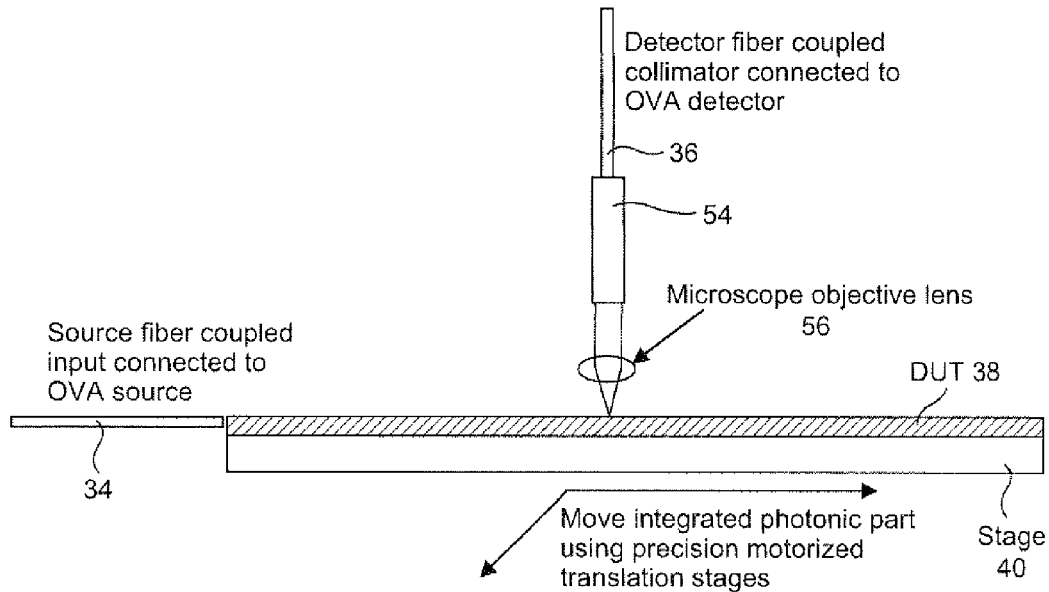
FIG. 3 illustrates an example PLC light probe configuration where the stage moves the DUT.

The optics collecting light scattered from the DUT are preferably located outside an evanescent field of the DUT. One non-limiting example optical detector 36 may include a fiber-coupled microscope objective lens 56 shown in FIG. 3. The lens is fiber coupled via a collimator 54 to the OVA detector port. This non-limiting example of a fiber-coupled microscope objective lens example provides a slower scanning update rate, but a larger mechanical scanning range with higher resolution (e.g., centimeters of scan range with around 10 microns of resolution) This example implementation is advantageous when the device being scanned is larger than the field of view of the imaging lens 56 (microscope objective), as may often be the case with large PLC devices or PLC devices that are embedded in a wafer.

Figure 4:
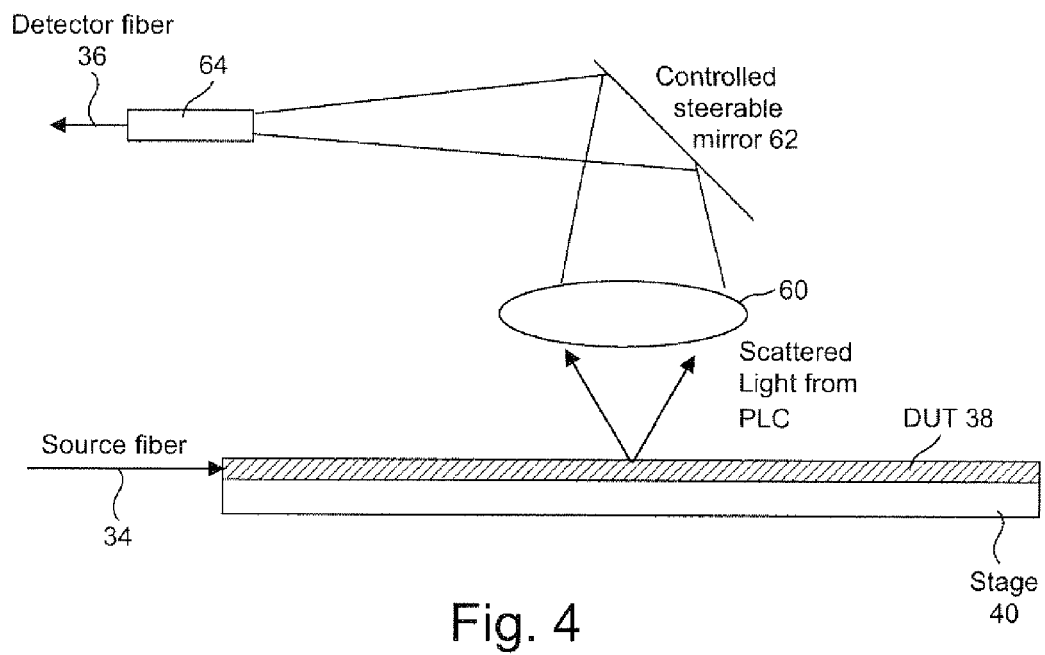
FIG. 4 illustrates another example PLC light probe configuration where the DUT is stationary and the scanning is accomplished with a steerable mirror.

Another non-limiting example optical detector 36 may include a steerable scanning mirror 62 and an objective lens 60 as shown in FIG. 4. The controller 10 can steer the scanning mirror 62 to detect scattered light from different locations along the DUT 38. In this way, images may be acquired more quickly as compared to the translation stage example embodiment, but the spatial range of the scan may be limited by the deflection possible in the mirror, A Micro-Electro-Mechanical Systems (MEMS) is one example of a scanning mirror. The field of view of such a MEMS mirror may be adjusted by changing the imaging optics either through the use of a zoom lens or a replacement of the optics.

Figure 5:
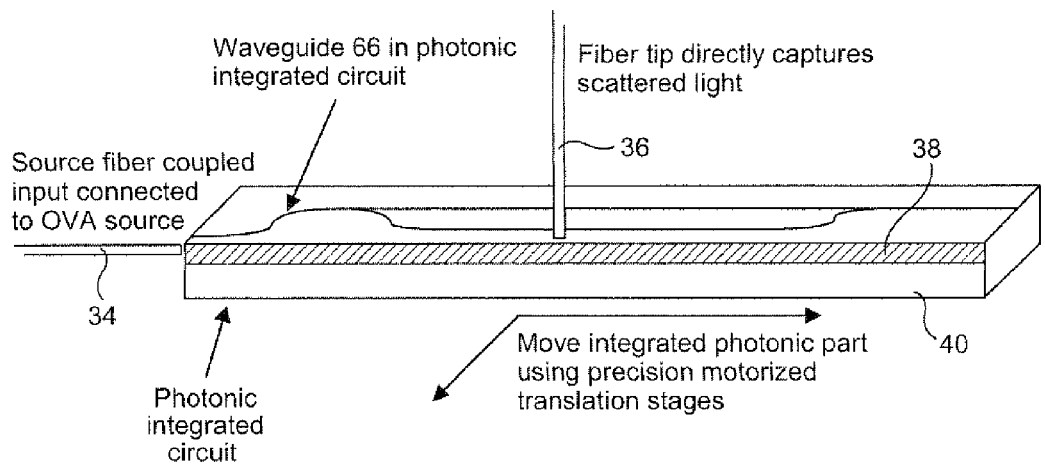
FIG. 5 illustrates an example used for initial testing where a fiber tip directly to captures scattered light from a PLC.
Figure 6:
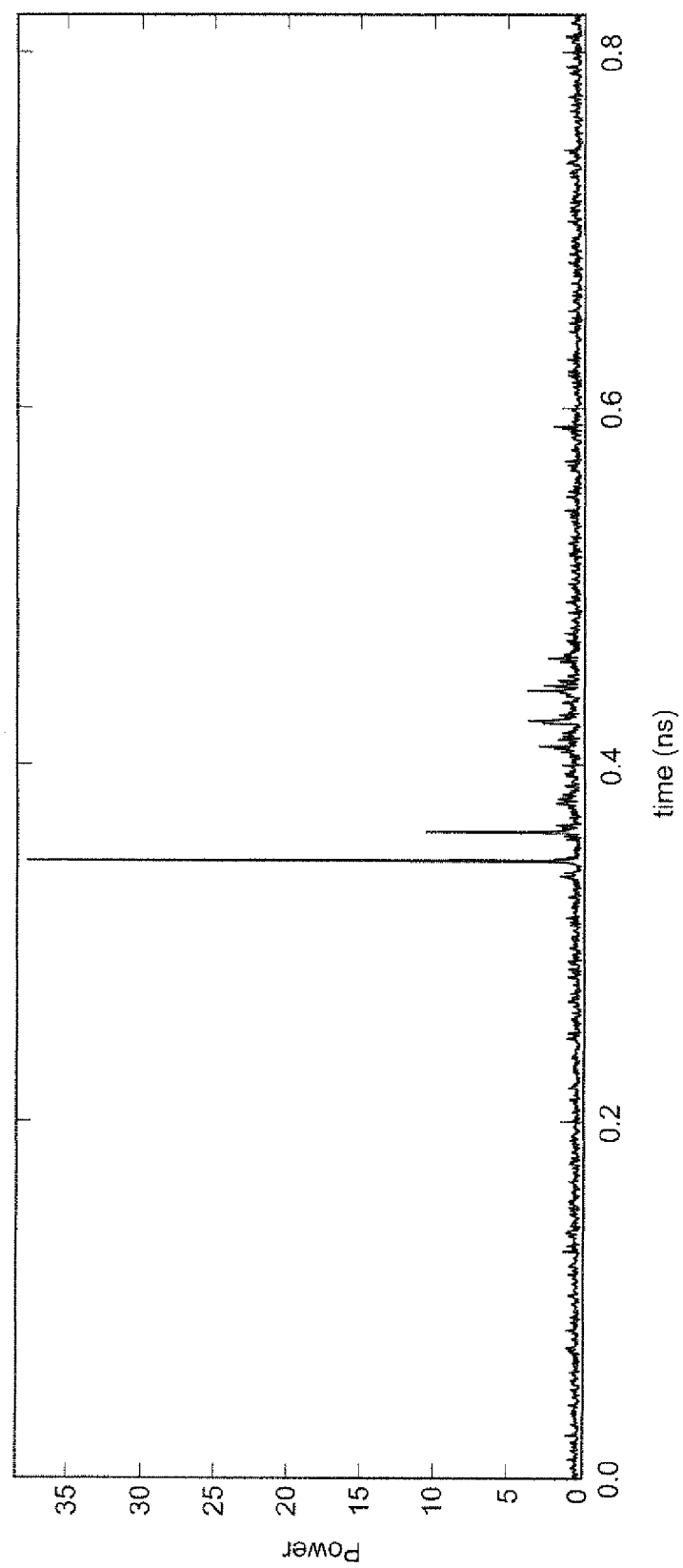
FIG. 6 is an example graph of scattered light intensity or power vs. time obtained using time domain OFDR measurements taken at a particular location on the PLC waveguide surface.

A non-limiting example implementation successfully tested by the inventor is illustrated in FIG. 5 and uses a cleaved end of a fiber as the optical detector which avoids the need to focus the system and mount the optics, but likely affected the efficiency of the light collection. A motorized optical translation stage 40 was used to move the PLC 38 under the cleaved fiber tip 36 to scan the waveguide 66 in the photonic integrated circuit at multiple locations. At each location of the detection fiber 36 above the PLC, a measurement was taken with the transmission OFDR/OVA 50 which yielded a complex-valued (real and imaginary parts) time response of the system from the source port of the transmission OFDR/OVA 50 to the detection port of the OFDR/OVA 50. The detected light intensity or brightness as a function of time is then calculated at each point along the DUT 38. A non-limiting example graph illustrating the detected light intensity or brightness as a function of time for point along the DUT 38 is shown in FIG. 6. Since the length of fiber from the tip of the detection fiber 36 to the detection port of the transmission OFDR/OVA 50 is kept constant, any change in the arrival time of the detected light pulse must be caused by a change in the position of the detection fiber tip relative to the PLC being scanned. This measurement is repeated at multiple points along the DUT to construct a three dimensional set of data that represents the intensity of light scattered from the PLC relative to its time of launch from the OFDR/OVA 50.

Figure 7:
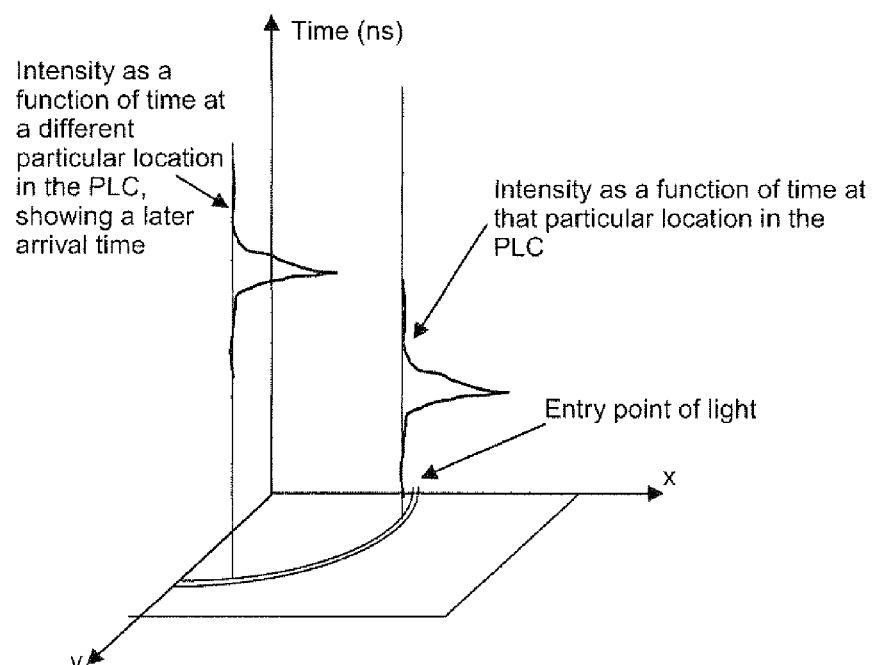
FIG. 7 is an example 3-D graph illustrating an organization of OFDR measurement data in a matrix of points where two of the dimensions are space, and the third dimension is time between transmission and detection of an optical pulse for the DUT.

All of the time-domain scans may be placed into a 3-D matrix, where one dimension is mapped to the time between emission of a light pulse and its arrival at the OVA detector. The other two dimensions are mapped to x-y space to identify the location along the DUT. An illustrative of this type of matrix data organization is conceptually illustrated in FIG. 7. A light pulse enters at a location As the light pulse moves to each of multiple points along the waveguide across the x-y plane, scattered light intensity is measured at each point as function of time. For the time measurement at the point closer to the y-axis in FIG. 7, the intensity waveform corresponding to the light pulse has "moved" further along the time axis (in this case shown as moving up). One can think of the time measurements for multiple DUT points as the assembly of a motion picture where the light signal amplitude at time is the intensity in one pixel of the first frame of the movie. The light signal amplitude at time zero plus one index is the intensity of the same pixel in second frame of the movie. A non-limiting example of a time increment for a scan (e.g., assume 20 nm) may be 400 femtoseconds provides excellent time resolution and allows human observation the propagation of light through the device. A pulse of light 400 femtoseconds long would be about 120 microns in length in air and about 80 microns in length in silica. This 80 micron dimension is much smaller that the length of the waveguide being tested, and as a result, the system can be used to observe the propagation of the pulse through the waveguide.

Figure 8:
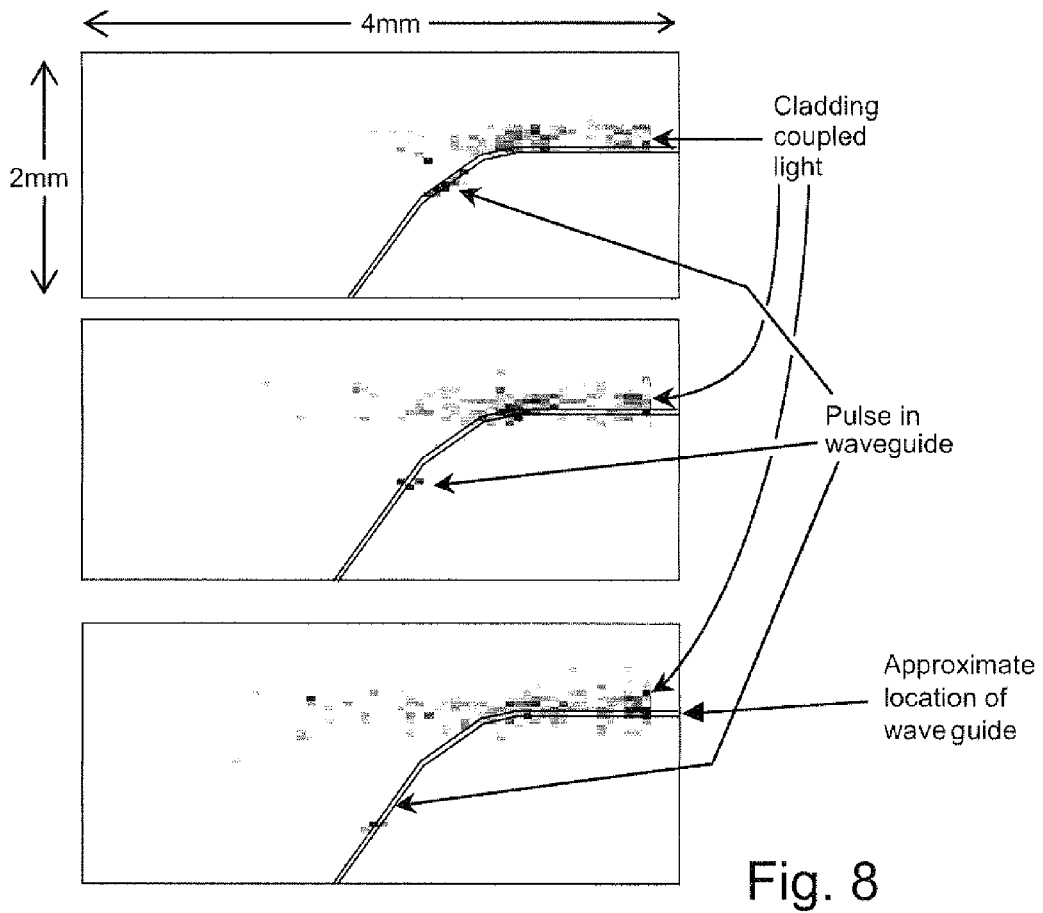
FIG. 8 illustrates an example with three frames of a time series showing a waveguided light pulse propagating through an integrated photonic chip.

By displaying the data mapped to space as a two dimensional intensity plot, and sequencing through the frames as a function of time, a moving picture of the light propagating through the waveguide may be generated. Three frames of such a "movie" are shown below in FIG. 8. Although moving pictures like this are difficult to illustrate in a static document, FIG. 8 attempts to capture the flavor of a moving picture by including several frames. Using for this illustration a waveguide grating photonic chip as a DUT, initial tests with a transmission OFDR indicate that when light is launched from a fiber input and collected with an SMF-28 like fiber nearly in contact with the waveguide grating photonic chip surface, the loss is about 80 to 100 dB. From the top frame to the bottom frame, one can see the light pulse move down the slope of the waveguide. Also shown is a significant amount of scatter detected outside of the waveguides on the chip even several millimeters from the waveguide in two dimensional modes in the waveguide cladding. Since one of the boundaries of the cladding modes is the surface of the glass, the scattering out of the modes is very efficient causing even very small amounts of light in the cladding to show up as very bright (large signal) in these scans. Nevertheless, the images allow the viewer to clearly distinguish the cladding light from the pulse moving down the waveguide. Since light in the cladding scatters out of the waveguide very efficiently, this light can overwhelm the signal from the light traveling within the waveguide if the arrival time cannot be resolved. Therefore, imaging techniques that cannot resolve the time of arrival of the light will be unable to clearly observe the light in the waveguides, and it is this light which is of primary concern in testing the DUT.

The speed of acquisition of such images is a primarily function of the scan rate of the OFDM system. It is desirable, but not necessary, to implement one or more data reduction algorithms in firmware to speed up the acquisition of the moving images. For example, current OFDR systems have −130 dB sensitivity when swept at 100 nm/s, and the inventor achieved scan rates of 1000 Hz in which the data is fully transformed and covers a length of about 0.2 m in transmission. At this example and non-limiting rate, a 500×500 pixel image could take about 5 minutes to acquire. This image will actually be a series of images, with as many as 500 of these frames having relevant information about light propagation through the photonic circuit. Relevant frames include those from when the light pulse enters the DUT to when the last bit of observable light exits the DUT.

Figure 9:
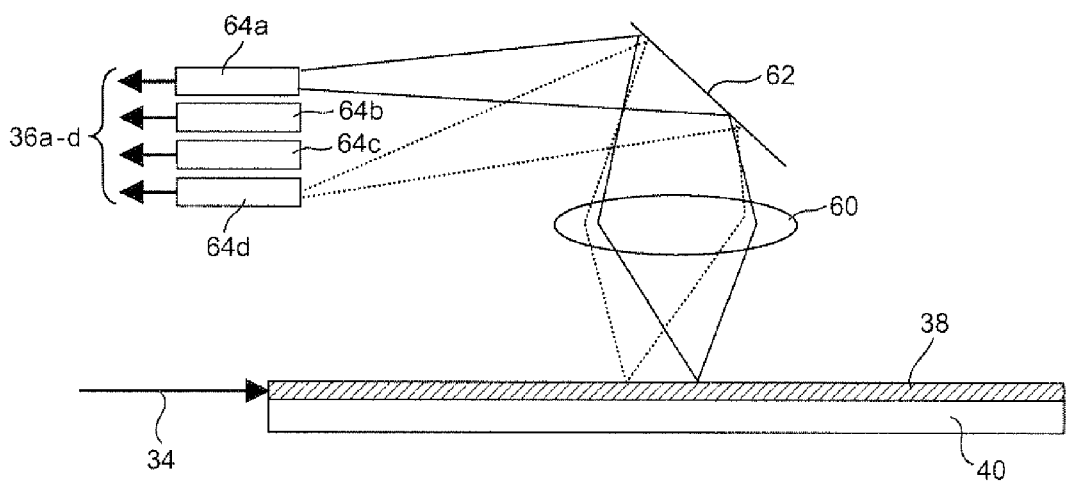
FIG. 9 is illustrates another example PLC light probe configuration where the DUT is stationary and imaging is accomplished with a steerable mirror and multiple receiving fibers.

Because light is scattered out of the PLC at many points during every scan, the entire image could be gathered in a single scan. But carrying out such a measurement requires a large number of separate channels and parallel operations, e.g., 250,000 separate channels need to be digitized and transformed for a 500×500 image. An intermediate approach to reduce the workload may be employed and is illustrated in FIG. 9, where there are multiple fibers 36a-36d (four are shown) on the detector side of the OVA 50, with each fiber measuring via a corresponding collimator 64a-64d a time response of a particular point on the PLC surface. The four channels a-d illustrated speed the measurement by a factor of four reducing the non-limiting 500×500 pixel image example scanning time above from 5 minutes to about 1 minute.

It is also possible to time delay multiplex the signals since the duration of the PLC response will rarely be more that 1 ns and an OFDM system might have a 300 ns useable range, as a non-limiting example, which means that path lengths from zero to 60 meters can be accommodated. Because many devices of interest are smaller than this, multiple detection fibers may be used, each detection fiber with a unique delay, and all of them separated by substantially more than the largest delay in the DUT. Each detector fiber then has a "slot"

in the total 60 meter length in which its impulse response signal reside. A problem with this time delay multiplex approach is providing a practical loss-free way of combining the light signals from the detecting fiber(s). For example, combining ten fiber signals results in a factor of 10 loss in power is because optical combiners inherently lose light. Although such a loss is significant, the time delay multiplex approach may be useful in applications where the system is not "light-starved."

An eight channel embodiment, as a non-limiting example, benefits significantly from a reduced required signal acquisition bandwidth as compared to a one channel embodiment. Allowing for a 25 cm range, a 100 nm/s scan gives a top frequency of 31 kHz. Inexpensive and high quality A/D converters are available in this band for audio conversion. The reduced bandwidth also means that less optical power is required in the reference light to become quantum limited, which means, essentially, that a single photon can be detected.

Another possible application of this technology is in the measurement of optical fiber and features within optical fibers. Bragg gratings may be "written" into optical fiber. This application can benefit from being able to directly observe light pulses incident on the gratings and scattering from the gratings. FIG. 10 shows an example where scatter is measured from a Bragg grating in a DUT.

The above-described examples collect light that scatters out of a waveguide assuming that the source light is coupled into the waveguide using standard methods of attaching optical fiber. In some cases, it may be advantageous to introduce light into the waveguide from above the surface of the waveguide using the same type of lens-based optics described previously to collect the light by focusing the light into a single spot on the DUT and coupling the light into the waveguide using scattering mechanisms similar to those that scattered the light out of the waveguide. This method of coupling light into a waveguide has the advantage that the device does not need to be removed from the wafer or connectorized to couple light into the waveguide.

Planar light circuits (PLCs) may be manufactured on a silicon wafer with the waveguides and other structures being deposited onto the wafer using various fabrication processes. At the end of the wafer fabrication, multiple PLC devices are present on the wafer, as shown in FIG. 11. A single wafer may have 50 to 200 individual PLC devices fabricated on it. Each PLC device must be cut apart or "diced" and tested. This type of photolithographic PLC fabrication usually does not have a 100% yield, and so many of the PLCs on the wafer will be defective. It would be highly advantageous to identify defective optical components or devices prior to dicing and any further processing because the post wafer-production cost represents a substantial amount of the overall cost of the final component.

Figure 12:
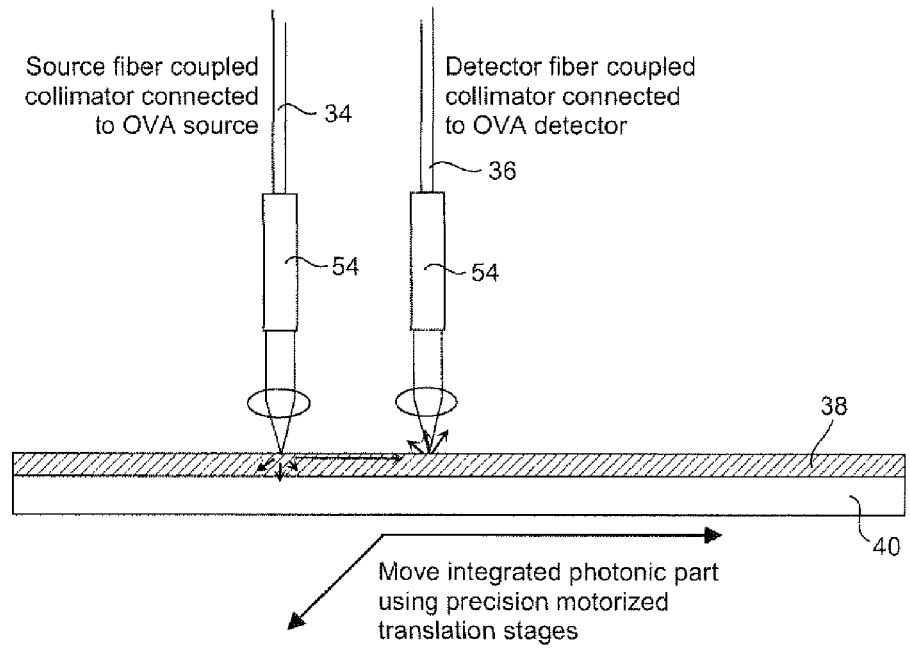
FIG. 12 illustrates an example of a scatter-in and scatter-out embodiment that may be used in the example PLC wafer application.

FIG. 12 illustrates an example of a scatter-in and scatter-out example embodiment that may be used in an example PLC wafer application. Light can be coupled into and out of the waveguide using the scatter in the waveguide as illustrated in FIG. 12, Light emerging from the source port is focused on a spot in a waveguide in the PLC. Imperfections in the waveguide will cause some percentage of the light to be coupled into the guided mode of the waveguide, referred to here as a scatter-in technique. Similarly, as this light is guided along the waveguide, some portion of the light will be coupled into radiating modes, and because the light has exited the guided mode, this is referred to as a scatter-out technique. The collection efficiency assuming uniformly distributed scatter is:

$$\kappa = \frac{1}{2}\left(1 - \sqrt{1 - \left(\frac{NA}{n}\right)^2}\right) = \frac{1}{2}\left(1 - \sqrt{1 - \left(\frac{.3}{1.5}\right)^2}\right) = 0.01,$$

where κ is the coupling efficiency, NA is the numerical aperture of the two objective lenses in FIG. 12, and n is the index of refraction of the waveguide. Using this equation, a 0.3 NA objective produces a 20 dB capture loss or a 1 percent coupling efficiency.

The scatter efficiency can be estimated from the loss per unit distance in the waveguide, generally given in dB per meter. For a silica device, this can be as low as 1 dB per meter. The scatter efficiency, γ, is given by, $$\gamma = 1 - 10^{-\frac{\Delta \rho}{10}} = 1 - 10^{-\frac{10^{-5} \cdot 1.0}{10}} = 2.3 \times 10^{-6} \rightarrow -56 \text{ dB}$$

where Δ is the spatial resolution or length of the waveguide over which scatter light is captured, and ρ is the scatter induced loss in dB per unit length.

The loss for the path from the source collimator, through the source objective, into the waveguide, through the waveguide, out of the waveguide, through the detector objective, and into the detector collimator, shown in FIG. 12 is 2×20+2×56=152 dB This level of sensitivity or better is possible with an OFDM-based system which can also obtain scatter information from any arbitrary point on the PLC to any other arbitrary point on the PLC. However, the transfer function from the input of the device to the output of the PLC is likely to be a focus because the transfer function determines the operating characteristics of the device in normal use. The transfer function measurement between input and output ports of the waveguide (i.e., at the ends of the waveguide) is also typically easier to make than measurements between other arbitrary points in the waveguides.

Figure 13:
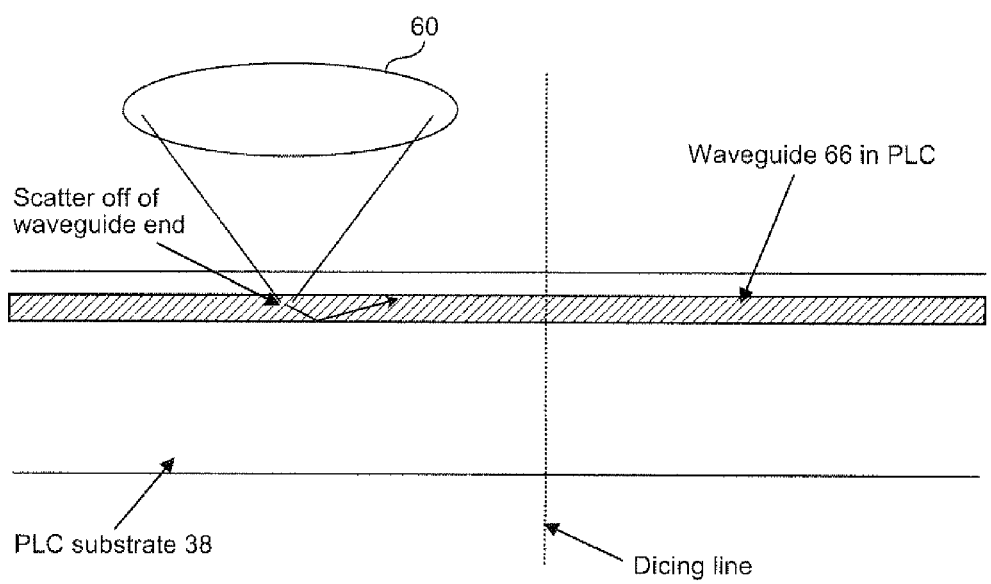
FIG. 13 illustrates an example terminating a waveguide to enhance scatter coupling that may be used in the example PLC wafer application.

FIG. 13 illustrates an example of terminating a waveguide to enhance scatter coupling that may be used in the example PLC wafer application. The end of the waveguide 66 presents a discontinuity that can be used to scatter more light into the waveguide. Since the portion of the wafer to the left of the dicing line is discarded when the device is connected to fiber, desired structure(s) may be put in this region without affecting the final characteristics of the PLC device. Therefore, the waveguide structure may be modified to increase the scattering into the waveguide mode and reduce the coupling loss, which in one non-limiting example was estimated above to be about 56 dB for the unaltered waveguide. One way to increase scattering loss is to increase the doping density of the waveguide 66, thereby increasing the number of defects which serve as scattering sites.

Figure 14:
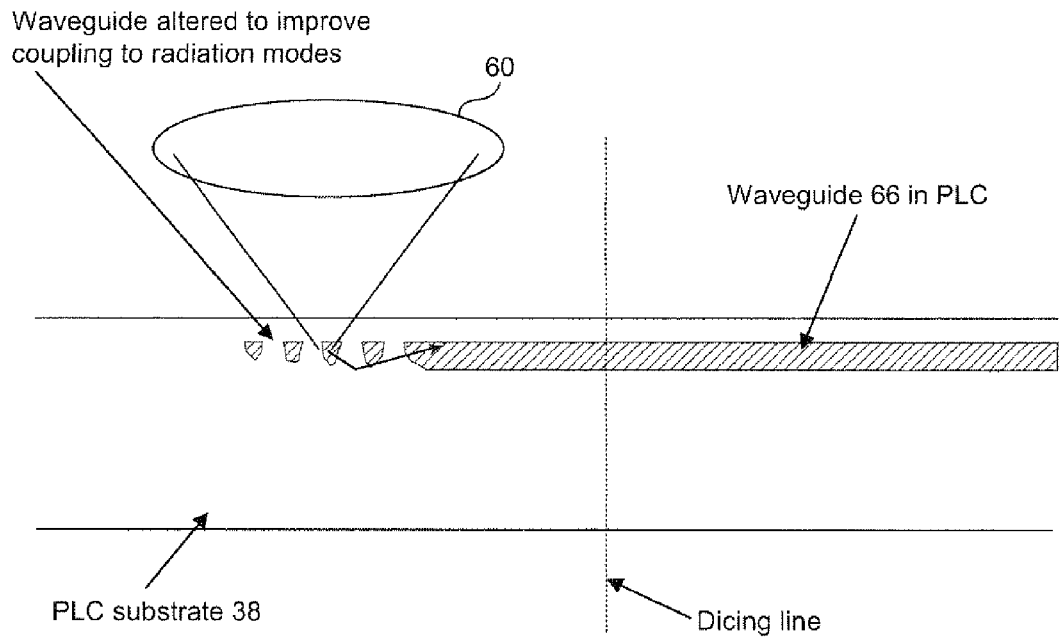
FIG. 14 illustrates an example incorporating a radiation coupling grating to facilitate scatter-in, scatter-out measurements that may be used in the example PLC wafer application.

Another example way to achieve higher scatter levels into the waveguide mode at the end of the waveguide is to create a spatial pattern at the end of the waveguide to form a sort of grating. FIG. 14 illustrates an example incorporating a radiation coupling grating to facilitate scatter-in, scatter-out measurements that may be used in the example PLC wafer application. The grating couples guided modes to free-space or radiation modes. Most foundries cannot achieve the 1000 nm feature size required to make a highly efficient grating for coupling into radiation modes. But a grating with a longer period will likely create a grating at the higher harmonics that will couple into the waveguide modes. Even a weak harmonic can produce significant coupling improvements.

Figure 15:
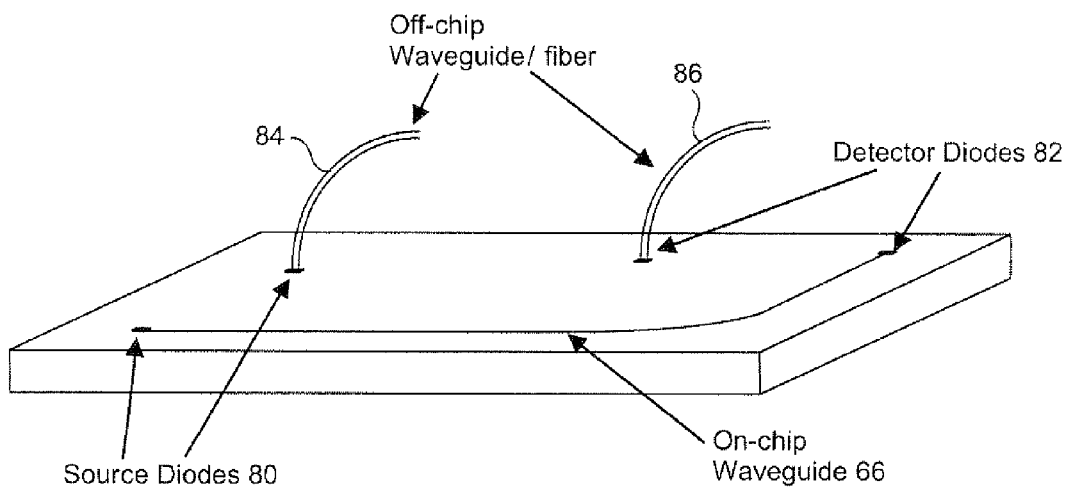
FIG. 15 illustrates an example of on-chip and chip-to-chip optical communications.

Optical waveguides are being developed for on-chip communications and chip-to-chip communications. An on-chip waveguide 66 is illustrated in FIG. 15. High speed optical interconnects will likely require new instrumentation to characterize and validate the operation of these new optical structures. Since the sources and detectors will be embedded entirely in the chip, traditional means of testing the optical connections (fiber connections) will not work. A scatter-in-scatter-out approach such as that described above is a solution to this problem. By placing the focal point of the source light on the interface between the embedded laser diode 80 and the optical waveguide 66, and the focal point of the detector light on the interface between the detector diode 82 and the optical waveguide 66, one can check the loss and delay of the optical connection between these two points can be checked. In some example cases, optical connections can be used between chips using micro-fiber waveguides 84 and 86. These microfibers guide light from source diode lasers 80 on one semiconductor chip to diode detectors 82 on a different semiconductor chip. These microfibers can be relatively lossy since the distances are small (tens of centimeters). Because the loss originates primarily from scatter, the microfibers offer good opportunities for scatter-in scatter-out measurements.

Figure 16:
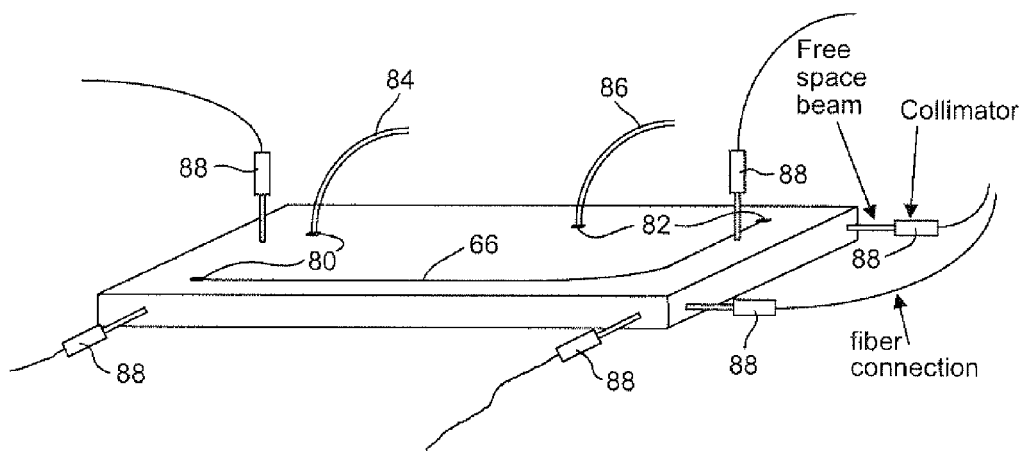
FIG. 16 illustrates an example using optical position sensing in a scanning OFDR microscope.

In some instances, optical position sensing may not be cost effective largely due to the higher cost of optical components, particularly sources. Optical position sensing does have the advantage, however, of operating over large ranges when compared with capacitive or inductive position sensing. Also, very high resolution measurements are possible with optical position measurements. Because very high precision optics and sources are already present in the example systems described above, the addition of one or more position sensors will not add substantially to the overall cost of the system. FIG. 16 illustrates an example using optical position sensing in a scanning OFDM microscope. Each collimator shown in FIG. 16 is a port of and OFDR interferometer. Light will be reflected from both the surface of the collimator, and the surface of the DUT. Using OFDR, this distance can be resolved to beter than 10 nm. Because the ranges are very short, and the reflections relatively large (when compared with inherent waveguide scatter), only a small amount of the laser light is required to drive each of these OFDR ports. Distance measurements using OFDR provide for relatively long ranges (multiple centimeters) and high resolutions (10's of nanometers) with no physical contact with the device being measured.

The technology in this application also provides an entirely new way to characterize silicon devices. Observing the time domain propagation of light through semiconductors provides new information. For example, if semiconductor devices are fabricated on a scale of 45 nm, (ten times smaller than the wavelength of 1550 nm light in silicon), direct observations of the smallest structures will not be possible. However, semiconductors are often fabricated by repeating structures 100's to millions of times. Since these structures are made with great regularity, orderly diffraction patterns should be readily measured using the technology in this application and analyzed to confirm the correct underlying structure. Since the technique described here uses OFDM to obtain measurements, each measurement contains a phase as well as an amplitude signal. Orderly diffraction patterns will scatter light with orderly phase advances, and so by focusing the source light at one point, and focusing the detection collection at a set of locations, the phase advancement as a function of distance can be plotted, and the variation in this phase advancement will provide information about the underlying structure.

Figure 17:
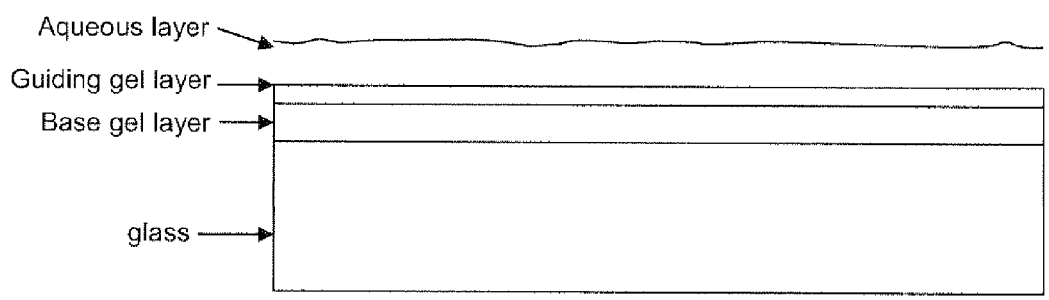
FIG. 17 illustrates an example application to an aqueous and gel based waveguide for proteomic and other biological applications.
Figure 18:
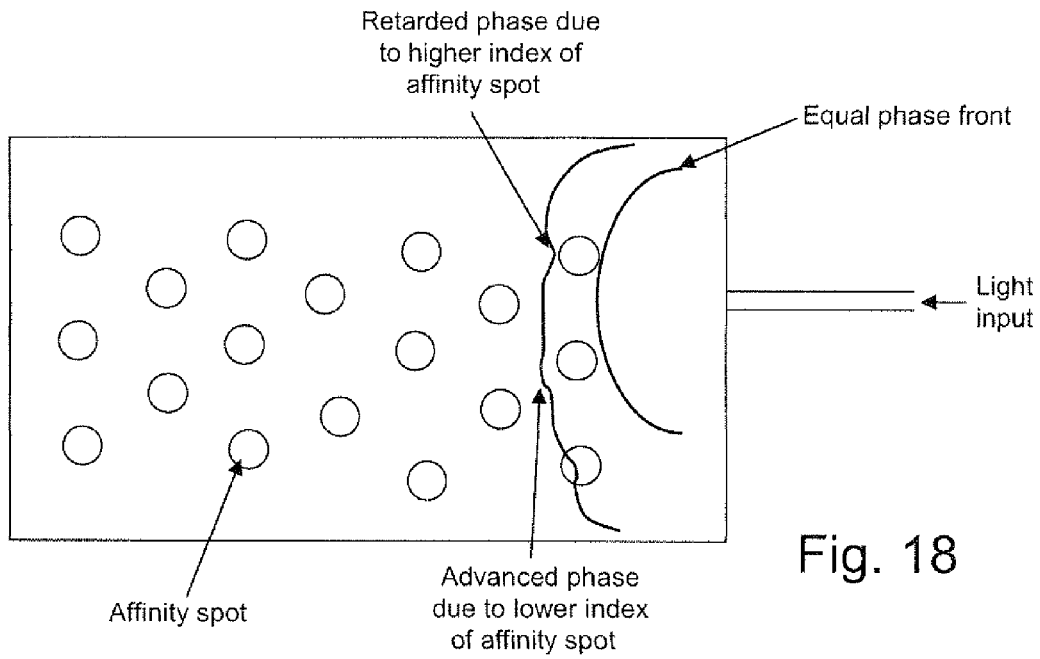
FIG. 18 illustrates an example of phase front retardation/advancement as targets bond to affinity layers in a two dimensional waveguide.

The technology also has biological applications: An inexpensive way to produce a guided wave in a plane (planar waveguide) is to lay down a layer of gelatin with a slightly higher index that the gelatin layer below it as shown in FIG. 17. Such a waveguide can serve as the basis for new class of biological instrumentation. Because a scatter detection system using the technology described in this application can measure the propagation time and phase of the light propagating through the gelatin waveguide with high accuracy, it can also be used to measure the local refractive index of this guided wave gelatin layer. We can then use this measurement of the index to detect protein binding events. If small areas of the gelatin planar waveguide are doped with compounds which target certain molecules, then the index of refraction of these small areas can be measured using the technology in this application to measure a change in their index of refraction to detect the presence of the molecules in question when they bond to the doped layers as illustrated in FIG. 18.

More complex tests using this technology may be performed using electropharesis, optopharesis, or other methods of dispersing mixtures of compounds. In these techniques, mixtures of molecules are separated into their constituent species by providing a force (such as an electric current) that causes the molecules to move through the gelatin layer. Because each molecular species moves at a different speed, they will separate into distinct bands. These bands of molecules will cause a change in the local index of refraction that will be observable. The advantage offered by the optical probing is the dispensing of the need for dyes to locate the dispersed molecules, and the possibility of spectral characterization.

Sensing plates may also be constructed using surface plasmon waveguides. These are thin strips of metal, typically gold, deposited on the surface of glass or silicon. Light is guided along the surface of the metal in a mode referred to as a "surface plasmon." An advantage of surface Plasmon waveguides for biological sensing comes from the confinement of the light at the surface of the waveguide where biological affinity agents can be deposited, and probed by the guided mode. Some commercial systems, e.g., Biacore Inc., already use surface plasmons as sensitive refractometers used to measure protein-protein interaction.

If visible light is used, then the wavelength of the light in the Plasmon will be about 250 nanometers. Over a 1 cm sensing guide, there would then be 40,000 waves. If a signal-to-noise ratio of 20 can be achieved, then the index of refraction resolution is roughly one part per million or $10^{-6}$. Surface Plasmon waveguides are very small, and FIG. 18 is not to scale. The waveguides could be tens of microns in width and spaced hundreds of microns apart. Therefore, a 1 cm strip of glass can hold 50 or 100 surface Plasmon waveguides, and a glass slide with four rows of 1 cm strips can hold 200 to 400 individual sensors. Assuming a non-limiting example OFDM scan rates of 1 KHz gives update rates for the entire chip in the tens of hertz. Microfluidic channels could be laid over these sensing regions allowing very small samples of fluid to be tested.

If the area to be imaged is about the size of a microscope slide, e.g., about 4 cm, then a 20 micron resolution is achieved, i.e., there will be 2000 independent points along the length of the slide. Allowing for a significant margin on the time of flight range, 20,000 points are allotted in this example for the total time-of-flight range available. Frame rates as high as 1000 frames per second are available in image capture products such as the FASTCAM 1024 PCI High speed digital camera. Using such an image capture device, a full scan could be obtained in just 20 seconds for this non-limiting example.

If the entire 2000 point range is played back at 60 frames per second, it would take 33 seconds to play the entire data set back. This is essentially real-time imaging. If the final image is selected to be 256×256 pixels, as one non-limiting example, the full processing of the data may be completed in about 1 millisecond if the transformation is performed using for example a field programmable gate array (FPGA).

Figure 19:
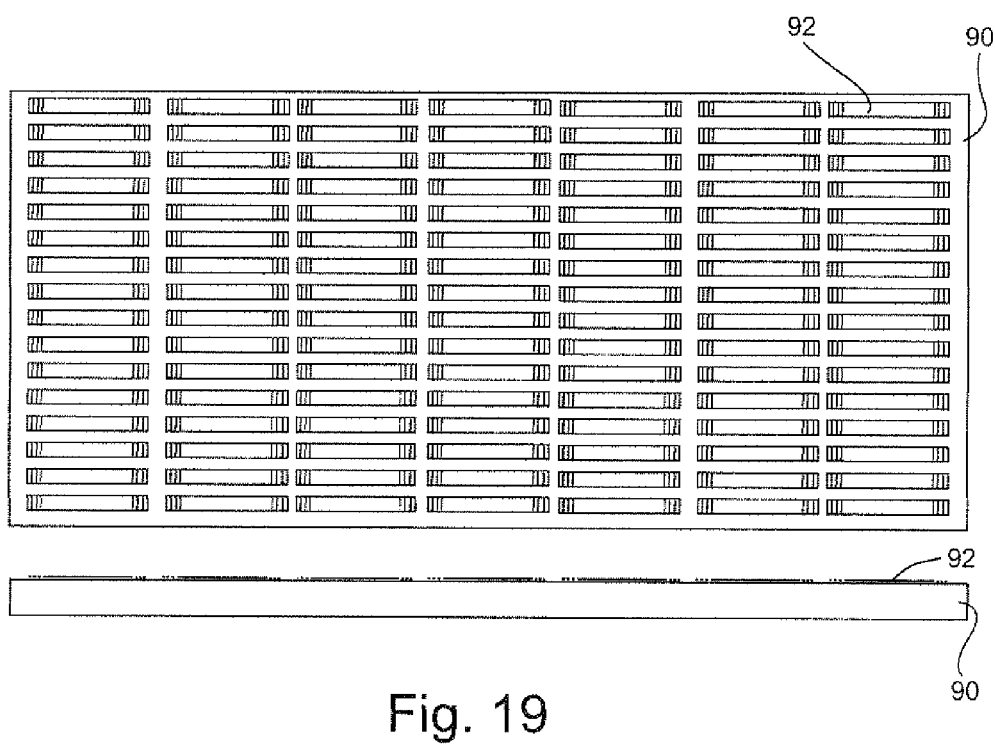
FIG. 19 illustrates an example application to multiple surface plasmon waveguides formed on a wafer.

FIG. 19 illustrates an example application to multiple surface plasmon waveguides formed on a wafer 90. A top view of the slide shows all of the gold-film strips 92 that make up the surface plasmon waveguides, and a side view of the wafer 90 illustrates the thin layer of the deposited gold films 92.

Figure 20:
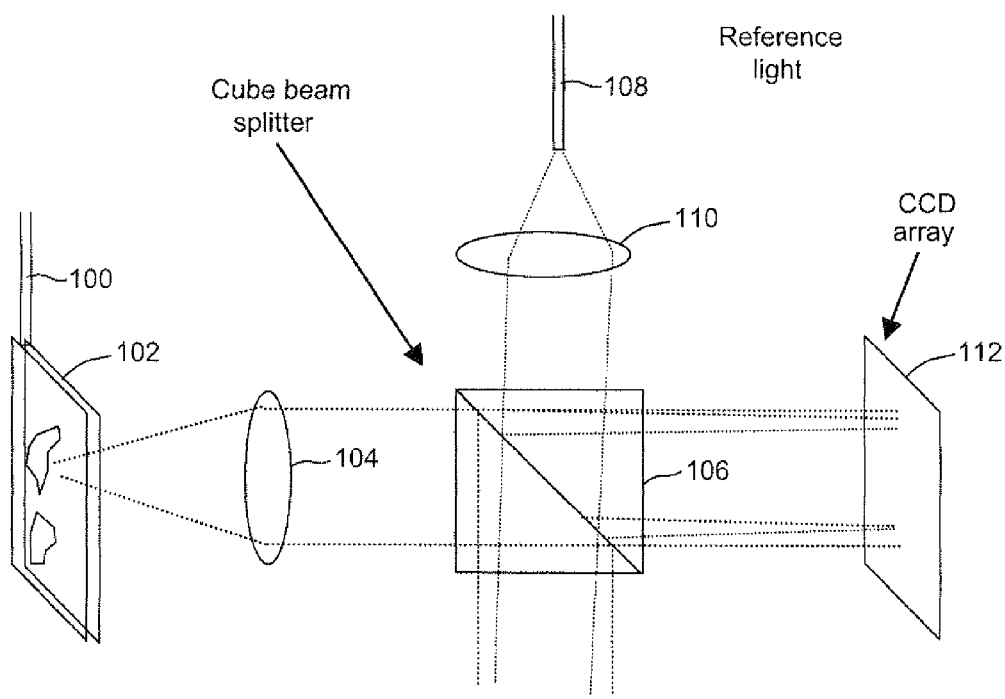
FIG. 20 is a non-limiting example of a transmission swept wavelength interferometric system for observing and testing waveguides using a CCD imaging array.

FIG. 20 is a non-limiting example of a transmission swept wavelength interferometric system for observing and testing waveguides using a CCD imaging array. The measurement light is introduced in to the DUT 102 using and optical fiber 100. The light scattered from the DUT 102 is imaged onto a CCD array 112 using a lens 104. The DUT 102 is imaged through a beam splitter 106. Reference light 108 is collimated using lens 110 into a beam large enough to illuminate a substantial portion of the CCD array 112. Since the measurement and reference light both originate from the same laser, and because the optical path lengths of the two have as small imbalance, interference will occur at the CCD array 112, just as it does in the individual detectors in the OFDM fiber configurations shown for example in FIGS. 2A and 2B.

In general, the technology described above collects scatter data at multiple locations within or on the DUT as a function of time. The OFDM processing permits fine time resolution (e.g., 0.1 picoseconds) that allows small optical delay distances (e.g., 30 microns) to be resolved and allows for accurate detection of small amounts of scatter (e.g., one trillionth) to be detected simultaneously with the fine time resolution. The technology has a wide range of application with only a few non-limiting examples described above for purposes of illustration.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An optical imaging apparatus based on optical frequency domain measurement (OFDM), comprising:
   a light source for coupling light into a device under test (DUT) having an internal volume and an external surface, the DUT externally radiating light at multiple locations along the external surface of the DUT;
   a light detector configured to detect externally-radiated light at a first location along the external surface of the DUT over a time period and at a second location along the external surface of the DUT over a time period;
   OFDM processing circuitry configured to generate light intensity data as a function of time based on an amount of externally-radiated light collected at each of the first and second locations along the external surface of the DUT;
   a memory configured to store the data for each of the multiple locations along the DUT as part of an image of the external surface of the DUT; and
   a user interface configured to provide to a user information indicating an amount of externally-radiated light at each of the multiple locations along the DUT based on the stored data.

2. The optical imaging apparatus of claim 1, wherein OFDM includes optical frequency domain reflectometry (OFDR), transmission-OFDR, and swept wavelength interferometry.

3. The optical imaging apparatus of claim 1, wherein the user interface is configured to display movement of light launched into the DUT as the light propagates along the DUT based on the stored data.

4. The optical imaging apparatus of claim 1, wherein the user interface is configured to display an intensity or brightness of light scattered by the DUT at a specific time from when the light was launched from the light source based on the stored data.

5. An optical imaging apparatus based on optical frequency domain measurement (OFDM), comprising:
   a light source for coupling light into a device under test (DUT) which scatters light at one or more locations along the DUT;
   a light detector for detecting a portion of light scattered at each of multiple locations along the DUT;
   OFDM processing circuitry for generating data corresponding to an amount of light collected at each of the multiple locations along the DUT as a function of time;
   a memory for storing the data for each of the multiple locations along the DUT; and
   a user interface for providing to a user information indicating an amount of light at each of the multiple locations along the DUT based the store time domain data,
   wherein the user interface is configured to display an intensity or brightness of light scattered by the DUT at multiple locations along the DUT as a calculated light pulse travels along the DUT based on the stored time domain data in a fashion that is distinguishable from DUT cladding mode light also detected by the light detector.

6. The optical imaging apparatus of claim 1, wherein the user interface is configured to show movement of a calculated light pulse through the DUT at a speed slower than an actual speed at which the light propagated through the DUT.

7. The optical imaging apparatus of claim 1, wherein the DUT is a planar waveguide light circuit (PLC) or photonic integrated circuit (PIC).

8. The optical imaging apparatus of claim 1, wherein the DUT includes multiple planar waveguide light circuits (PLCs) formed on a wafer, and
   wherein the optical imaging apparatus is configured to test each PLC on the wafer without dividing the PLCs into individual PLC dies.

9. The optical imaging apparatus of claim 1, wherein the DUT is a gelatin waveguide.

10. The optical imaging apparatus of claim 1, wherein the DUT is a surface plasmon waveguide.

11. The optical imaging apparatus of claim 1, wherein the multiple locations exceeds a thousand locations.

12. The optical imaging apparatus of claim 1, wherein the multiple locations is sufficient to create a 128×128 image of light intensity of externally-radiated light along the DUT over time.

13. The optical imaging apparatus of claim 1, wherein the data corresponding to an amount of externally-radiated light collected at each of the multiple locations along the external surface of the DUT corresponds to an impulse response measurement of the DUT, and wherein a time resolution of the impulse response measurement is less than one picosecond.

14. The optical imaging apparatus of claim 1, wherein the OFDM processing circuitry is configured to use a Fourier transform to calculate a time domain impulse response for a path of the light through the DUT.

15. The optical imaging apparatus of claim 1, wherein the OFDR processing circuitry is configured to generate DUT location data associated with light intensity for each of the multiple locations and the memory is configured to store the DUT location data associated with light intensity for each of the multiple locations.

16. The optical imaging apparatus of claim 1, wherein the OFDM processing circuitry is configured to generate DUT location data processing at a time resolution on the order of 0.1 picoseconds for optical delay distances on the order of 30 microns to be resolved so that an amount of externally-radiated light on the order of one trillionth is detectable.

17. The optical imaging apparatus of claim 1, further comprising:
a translation stage arranged to move the DUT beneath the light detector.

18. The optical imaging apparatus of claim 17, wherein the light detector is an optical fiber positioned adjacent to the DUT.

19. The optical imaging apparatus of claim 1, further comprising:
multiple fiber detectors for detecting scattered light.

20. The optical imaging apparatus of claim 1, further comprising:
a scanning mirror, and
a objective lens arranged to acquire externallyy-radiated light at each of the multiple locations along the external surface of the DUT.

21. The optical imaging apparatus of claim 1, wherein the optical imaging apparatus further comprises an electronic translator for automatically moving the optical detector to the multiple locations of the DUT.

22. The optical imaging apparatus of claim 1, wherein the light detector is a CCD array.

23. The optical imaging apparatus of claim 1, wherein light source is a tunable laser, and wherein the OFDR processing circuitry includes:
a first optical splitter for splitting incoming light from the tunable laser into a first beam and a second beam;
a monitor interferometer for measuring a change in wavelength of the light source using the first beam;
a second optical splitter for splitting the second beam between reference light and measurement light directed to the DUT;
an optical input for coupling measurement light into the DUT;
an optical output for coupling to the light detector;
a coupler connected to the optical output for combining the reference light with light scattered from the DUT which generates interference fringes;
a fiber-coupled polarization beam-splitter configured to direct the combined light from the coupler in two orthogonal polarization states s and p to s and p detectors; and
data acquisition and processing circuitry, coupled to the user interface, for processing outputs from the s and p detectors to generating time domain data corresponding to an amount of light externally-radiated at each of the multiple locations along the external surface of the DUT as a function of time.

24. The optical imaging apparatus of claim 23, further comprising:
a gas cell for establishing an absolute wavelength of the light source using the first beam, and
wherein the OFDR processing circuitry includes a polarization controller configured for adjustment so that a DC level on the s and p detectors is approximately equal.

25. The optical imaging apparatus in claim 1, wherein light from the light source is launched into the DUT by scattering the light into the DUT.

26. The optical imaging apparatus in claim 1, wherein optics collecting light externally-radiated from the DUT are located outside an evanescent field of the DUT.

27. A method for optical imaging based on optical frequency domain measurement (OFDM), comprising:
coupling light into a device under test (DUT) having an internal volume and an external surface, the DUT externally radiating light at multiple locations along the external surface of the DUT;
detecting externally-radiated light at a first location along the external surface of the DUT over a time period and at a second location along the external surface of the DUT over a time period;
using an OFDM device to generate light intensity data as a function of time based on an amount of externally-radiated light collected at each of the first and second locations along the external surface of the DUT;
storing the data in a memory for each of the multiple locations along the DUT as part of an image of the external surface of the DUT; and
providing information indicating an amount of externally-radiated light scattered at each of the multiple locations along the DUT based on the stored data.

28. The method in claim 27, wherein OFDM includes optical frequency domain reflectometry (OFDR), transmission-OFDM, and swept wavelength interferometry.

29. The method in claim 27, further comprising displaying movement of light launched into the DUT as the light propagates along the DUT based on the stored data.

30. The method in claim 27, further comprising displaying an intensity or brightness of light externally-radiated by the DUT at a specific time from when the light was launched from the light source based on the stored data.

31. The method in claim 27, further comprising displaying an intensity or brightness of light externally-radiated by the DUT at multiple locations along the external surface of the DUT as a calculated light pulse travels along the DUT based on the stored data in a fashion that is distinguishable from DUT cladding mode light also detected by the light detector.

32. The method in claim 27, further comprising displaying movement of a calculated light pulse through the DUT at a speed slower than an actual speed at which the light propagated through the DUT.

33. The method in claim 27, wherein the data corresponding to an amount of light collected at each of the multiple locations along the external surface of the DUT corresponds to an impulse response measurement of the DUT, and wherein a time resolution of the impulse response measurement is less than one picosecond.

34. The method in claim 27, further comprising using a Fourier transform to calculate a time domain impulse response for a path of the light through the DUT.

35. The method in claim 27, further comprising generating DUT location data associated with light intensity externally-radiated for each of the multiple locations, and storing the DUT location data associated with light intensity externally-radiated for each of the multiple locations.

36. The method in claim 27, wherein the DUT location data is processed at a time resolution on the order of 0.1 picoseconds for optical delay distances on the order of 30 microns to be resolved to detect an amount of scatter on the order of one trillionth.

37. The method in claim 27, wherein light from the light source is launched in the DUT by scattering the light into the DUT.

38. The method in claim 27, wherein optics collecting light externally-radiated from the DUT are located outside an evanescent field of the DUT.

* * * * *